United States Patent [19]

Clair et al.

[11] Patent Number: 5,547,637
[45] Date of Patent: *Aug. 20, 1996

[54] PRODUCTION OF CONCENTRATED AQUEOUS SOLUTIONS OF FERRIC CHLORIDE

[75] Inventors: Rene Clair, Martigues; Alain Gallet, Lavera, both of France

[73] Assignee: Atochem, Puteaux, France

[ * ] Notice: The term of this patent shall not extend beyond the expiration date of Pat. No. 5,219,531.

[21] Appl. No.: 401,439

[22] Filed: Mar. 9, 1995

Related U.S. Application Data

[62] Division of Ser. No. 32,182, Mar. 15, 1993, Pat. No. 5,422,091, which is a continuation of Ser. No. 672,772, Mar. 20, 1991, abandoned, which is a continuation of Ser. No. 345,241, May 1, 1989, abandoned.

[30] Foreign Application Priority Data

Apr. 29, 1988 [FR] France .................................. 88/05798

[51] Int. Cl.⁶ ..................................................... B01J 14/00
[52] U.S. Cl. ........................ 422/129; 422/211; 422/234; 422/256; 422/235; 422/198; 422/190; 159/DIG. 16
[58] Field of Search ........................... 422/211, 189–190, 422/129, 234, 256, 198, 235; 423/493, 558; 159/DIG. 16; 203/12

[56] References Cited

U.S. PATENT DOCUMENTS

| 1,054,400 | 2/1913 | Dow et al. | 423/493 |
| 1,938,461 | 12/1933 | Prutton | 423/493 |
| 2,096,855 | 10/1937 | Ladd | 423/493 |
| 5,219,531 | 6/1993 | Clair et al. | 422/234 |

FOREIGN PATENT DOCUMENTS 113798  10/1974  Japan .................................. 423/493

Primary Examiner—Robert J. Warden
Assistant Examiner—Hien Tran
Attorney, Agent, or Firm—Burns, Doane, Swecker & Mathis, L.L.P.

[57] ABSTRACT

35% to 45% by weight concentrated aqueous solutions of ferric chloride, directly useful as flocculating agents in a variety of water treatments, are prepared by (a) digesting iron with a dilute aqueous solution of hydrochloric acid until such acid has essentially been consumed and thereby producing an aqueous solution of ferrous chloride; (b) reacting chlorine with such aqueous solution of ferrous chloride, in the presence of a recycled aqueous solution of ferric chloride; (c) decompressing the step (b) reaction product solution to vaporize water therefrom, thereby concentrating same; and (d) recycling a fraction of the decompressed liquid phase to step (b) and recovering remaining fraction as final product aqueous solution of ferric chloride.

11 Claims, 1 Drawing Sheet

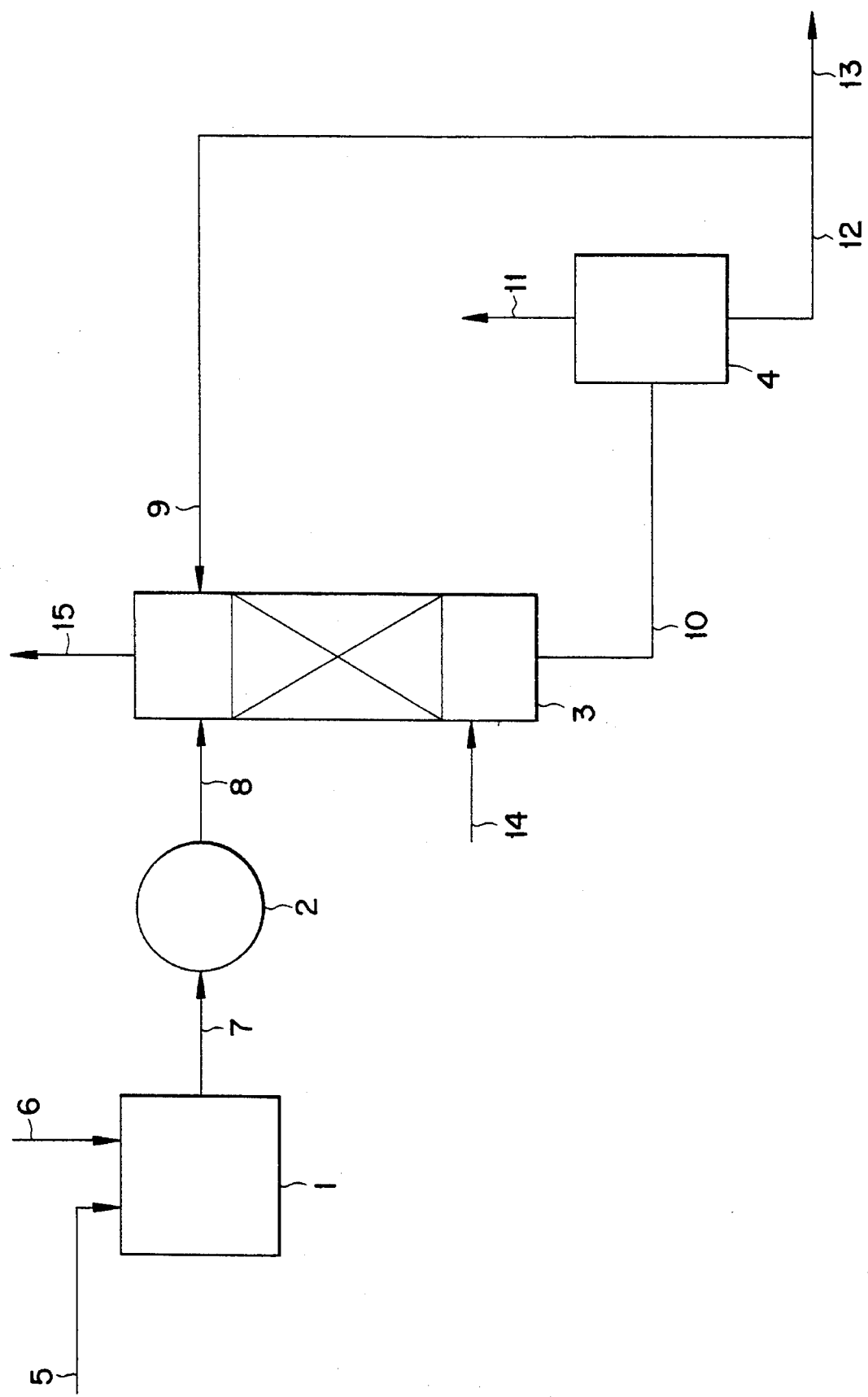

PRODUCTION OF CONCENTRATED AQUEOUS SOLUTIONS OF FERRIC CHLORIDE

This application is divisional of application Ser. No. 08/032,182, filed Mar. 15, 1993, now U.S. Pat. No. 5,422,091, which is a continuation of 07/672,772, filed Mar. 20, 1991, now abandoned, which is a continuation of application Ser. No. 07/345,241, filed May 1, 1989, now abandoned. Companion applications include, Ser. No. 07/676,467, now U.S. Pat. No. 5,118,489; Ser. No. 07/865,879, now U.S. Pat. No. 5,219,531; Ser. No. 08/032,184; and Ser. No. 08/462,908 all assigned to the assignee hereof.

BACKGROUND OF THE INVENTION

1. Field of the Invention

The present invention relates to the preparation of ferric chloride from dilute hydrochloric acid, and, more especially, to the preparation of 35% to 45% by weight aqueous solutions of ferric chloride.

2. Description of the Prior Art

The above aqueous solutions of ferric chloride are known to be useful as flocculating agents in water treatment. Compare, for example, Kirk-Othmer, *Encyclopedia of Chemical Technology*, 3rd edition, volume 24, pages 394–396 (1984) and volume 10, page 498 (1980).

The simplest process for the preparation of ferric chloride solutions entails digesting iron with concentrated hydrochloric acid; a solution containing approximately 36% by weight of ferrous chloride ($FeCl_2$) is thus obtained, and this is chlorinated to produce an aqueous solution of ferric chloride ($FeCl_3$) analyzing, by titration, at approximately 41% by weight. This 41% solution can be directly employed as a flocculating agent, and is the usual commercial form. A concentrated solution of $FeCl_2$ must be produced because $FeCl_2$ and $FeCl_3$ can undergo a partial hydrolysis over the course of concentration by evaporation, to give HCl. The presence of HCl in $FeCl_3$ is a particular problem in water treatment. The above process also requires the use of concentrated hydrochloric acid.

U.S. Pat. No. 4,066,748 describes a process for preparing ferric chloride beginning with a solution of $FeCl_2$ emanating from a descaling bath. This process requires both a concentration of the ferrous chloride as well as a two-step chlorination.

U.S. Pat. No. 3,682,592 describes a process similar to that of the '748 patent, but in which the ferrous chloride solution is contacted with oxygen.

Serious need exists in this art for a simple process for preparing ferric chloride from dilute hydrochlorine acid. A notable solution of hydrochloric acid is the water/HCl azeotrope, at a concentration of 20.5% by weight at atmospheric pressure. However, to produce ferrous chloride solutions containing a least 36% by weight $FeCl_2$, it is necessary to begin with an approximately 24% by weight acid solution.

SUMMARY OF THE INVENTION

Accordingly, a major object of the present invention is the provision of a simple process for the preparation of ferric chloride from dilute hydrochloric acid, which novel process permits the use of acid solutions having concentrations less than azeotropic and which avoids having to concentrate the solutions of HCl, and/or of ferrous chloride, and/or of ferric chloride.

Briefly, the present invention features the preparation of ferric chloride from dilute hydrochloric acid, comprising:

(a) contacting a dilute aqueous solution of hydrochloric acid with iron until the hydrochloric acid has been consumed;

(b) chlorinating the resulting solution to produce an aqueous solution of ferric chloride;

(c) decompressing the reaction product produced in step (b); and (d) recycling a fraction of the decompressed liquid phase to step (b), while recovering the remaining fraction as final product aqueous solution of ferric chloride.

BRIEF DESCRIPTION OF THE DRAWING

The FIGURE of Drawing is a schematic/diagrammatic illustration of the process/apparatus according to the present invention.

DETAILED DESCRIPTION OF THE PREFERRED EMBODIMENTS OF THE INVENTION

More particularly according to the present invention, the iron used in step (a) is either iron metal or iron oxides, or a mixture of metallic iron and iron oxides. It is convenient to employ iron cuttings, such as wastes from the machining of steel components, turnings resulting from the boring of steel components, or the residues from stamping operations. This recovered iron is oxidized to a greater or lesser extent.

The dilute hydrochloric acid solution is advantageously an aqueous solution of hydrochloric acid containing from 15% to 25% by weight of hydrochloric acid. The use of a higher concentration is also within the scope of the present invention, but it would be more simple in this case to employ a conventional prior art process. This invention is particularly applicable for the so-called residual acids which cannot be concentrated beyond the azeotropic composition. In general, these acids are at a concentration ranging from 15% by weight to the azeotrope. The use of an acid containing less than 15% by weight of hydrochloric acid too is within the scope of the invention, but it would be far simpler to first concentrate this acid to above 15% by conventional distillation. The dilute solution of the hydrochloric acid may also contain ferrous chloride and possibly also a minor amount of ferric chloride.

The step (a) may be carried out in any manner, but the operation is advantageously carried out at atmospheric pressure in a reaction vessel and under conditions such that a stoichiometric excess of iron is always present, to ensure that no hydrochloric acid remains in the ferrous chloride solution which results at the termination of this step (a). The reaction between the iron and the hydrochloric acid is complete and stoichiometric. Although the solution containing the hydrochloric acid may be at any temperature, a solution is advantageously employed having a temperature ranging from 20° to 50° C. and preferably from 35° to 45° C. The residence time of the acid may be of any length, but advantageously it ranges from 2 minutes to 30 hours, and preferably from 3 to 15 hours. It is also within the scope of this invention to add in step (a), in addition to the solution of dilute hydrochloric acid, an aqueous solution containing both hydrochloric acid and ferrous chloride, or containing ferrous chloride alone, such added solution comprising, for example, one emanating from a descaling bath. It is preferable that the amount of such added solution constitute not more than 20% and, preferably, not more than 10% by weight of the solution of residual hydrochloric acid. Using only a solution emanating from a descaling operation and which contains both $FeCl_2$ and HCl is also within the scope of the invention, but such a solution must not contain an excess of heavy metals, as this would present certain difficulties if the final product solutions were intended for the preparation of drinking water.

Prior to chlorinating the solution resulting from step (a), it is advantageous to either filter or decant it.

Step (b) is carried out by contacting the solution of ferrous chloride produced in step (a) with chlorine and a solution of ferric chloride. Liquid or gaseous chlorine, or a fluid containing chlorine, may thus be employed. The contacting may be carried out in any manner; it suffices only to ensure intimate contact between the chlorine and the ferrous chloride. The apparatus employed may have a number of stages operating in parallel or in series, and charged either cocurrently or countercurrently, or in any combination thereof.

For example, a stirred reactor or a reactor comprising a distillation column or absorption column, may be employed. Advantageously, a column equipped with contacting means such as plates or packing rings or with a number of these means may be employed. The ferrous chloride solution and the ferric chloride solution are charged into the top of the column and the chlorine is countercurrently introduced at the base of this column. A minor amount of chlorine is collected at the top of this column, if a stoichiometric excess thereof has been employed (relative to the amount of ferrous chloride), together with any gases which may have accompanied the chlorine, as well as a minor amount of water vapor which has been entrained by its vapor pressure. An aqueous solution of ferric chloride is recovered from the base of the column. It is also within the scope of the present invention to introduce the ferrous chloride and ferric chloride solutions at a number of points along the column. Likewise, the chlorine may be introduced at a number of points along the column.

The ferric chloride solution produced is next decompressed and a fraction of the liquid phase collected during this decompression is recycled to the step (b), while the remaining fraction is recovered as final product aqueous solution of ferric chloride. During the decompression, a gaseous phase consisting essentially of water vapor is obtained.

The chlorination of ferrous chloride to ferric chloride is complete and stoichiometric. Advantageously, a ferrous chloride residence time of at least 10 seconds, and preferably less than 4 hours, is observed. It is not necessary to chlorinate all of the $FeCl_2$; the specifications for $FeCl_3$ sometimes permit from 0.1 to 1% by weight of $FeCl_2$ in the ferric chloride solution. It too is within the scope of this invention to employ a stoichiometric excess of the chlorine.

The temperature of the ferrous chloride solution produced in step (a) advantageously ranges from 40° to 100° C., and preferably from 60° to 90° C. The temperature of the ferric chloride solution which is recycled and which results from the decompression in step (c) depends upon the temperature at the outlet of step (b) and the pressure at which the decompression is carried out. The temperature of the recycled ferric chloride at the inlet to step (b) advantageously ranges from 50° to 90° C., and preferably from 55° to 80° C. The temperature of the ferrous chloride produced in step (a), and the temperature of the ferric chloride recycled to the step (b) may be modified, for example with the aid of heat exchangers. Preferably, these solutions are used without their temperatures being adjusted. The temperature of the outlet ferric chloride solution depends essentially on the inlet temperatures of the solutions and on the amount of ferrous chloride to be converted into ferric chloride, but also on whether the apparatus utilized to perform the step (b) is adiabatic, isothermal, etc.

An adiabatic apparatus is preferred; the outlet temperature of the solution upon completion of this step (b) advantageously ranges from 60° to 95° C., and preferably from 65° to 90° C. Although the operation may be carried out at any pressure, it is simpler to conduct the step (b) at atmospheric pressure, or at a pressure close to atmospheric. This solution is decompressed at a pressure ranging from atmospheric pressure to a pressure of from 0.3 to 0.05 bar absolute. The decompression is carried out in a vessel of any type; it suffices merely that it have a geometry enabling separation of the gaseous phase and the liquid phase resulting therefrom. The vacuum is provided, for example, by a pump of a steam ejector.

In a static mode, the amount of ferric chloride constituting the output corresponds, in the number of moles, to the amount of ferrous chloride introduced into step (b). The amount of ferric chloride solution recycled to step (b) advantageously ranges from 5 to 10 times the amount of the ferric chloride solution constituting the output in this mode.

In another embodiment of the invention, the ferric chloride solution produced in step (b) may also be heated prior to being decompressed The heat exchangers which may be incorporated in the process loop to adjust the temperature of the ferrous chloride solution introduced into step (b), the temperature of the ferric chloride solution produced in said step (b), and the temperature of the recycled ferric chloride solution, may also be used to extract the heat energy in the case where the reaction becomes excessively exothermic, for example if the concentration of hydrochloric acid drifts to higher values.

In a preferred embodiment of the invention, and provided that the temperature levels are compatible, the heat energy from the production of ferric chloride may be transferred to the ferrous chloride feedstream solution for step (b).

Apparatus suitable for carrying out the process of the invention is shown in the FIGURE of Drawing. For the sake of clarity, the pumps, the valves, etc., have not been shown.

Step (a) is carried out in the vessel 1. The iron is introduced by inlet line 5 and the solution of hydrochloric acid through inlet line 6. A solution of ferrous chloride is thus produced which outlets via line 7 and is filtered in filter 2. Column 3 is charged with a stream of ferrous chloride through line 8 and with a solution of ferric chloride through line 9. This column 3 is also charged with a stream of gaseous chlorine via line 14. The resulting ferric chloride solution exits through line 10 and is decompressed in the vessel 4. The decompressed ferric chloride solution is withdrawn through line 12 and is divided into a final product recovery via outlet 13 and a fraction which is recycled via line 9. The decompression vessel 4 is connected via the line 11 to a steam ejector, not shown. The inerts and any unreacted chlorine are removed from the column 3, via outlet 15.

In order to further illustrate the present invention and the advantages thereof, the following specific examples are given, it being understood that same are intended only as illustrative and in nowise limitative.

EXAMPLE 1

An apparatus as shown in the FIGURE of Drawing was used, in which the column 3 was constructed of glass, having an inner diameter of 0.35 m and a packing height of 10 m.

A solution containing 170 kg/h of hydrochloric acid in 680 kg/h of water was introduced through inlet 5. A quantity of iron turnings greatly in stoichiometric excess relative to the amount of HCl had been introduced beforehand via line 6. The ferrous chloride solution was filtered and then introduced into the column through the line 3; its temperature was 70° C. A flow of 82.7 kg/h of gaseous chlorine was introduced through line 14, together with 5 kg/h of inerts, which exited the system via outlet 15. The column 3 was operated at a pressure of 1.1 bars absolute. The ferric chloride solution, at 82° C., was conveyed by the conduit 10 to the decompression vessel 4, where it was decompressed to 0.2 bars; its temperature decreased to 70° C. A final product solution of 379 kg/h of $FeCl_3$ diluted in 545 kg/h of water was recovered via outlet 13. 2,272 kg/h of $FeCl_3$ diluted in 3,269 kg/h of water were recycled via line 9.

EXAMPLE 2

The procedure of Example 1 was repeated, but the solution of hydrochloric acid was more dilute, i.e., 170 kg/h of HCl in 963 kg/h of water. The temperature of the stream in line 8 was 60° C. The ferric chloride solution transferred through line 10 was at a temperature of 84° C. It was heated to 93° C. prior to decompression in vessel 4 to 0.12 bars. After decompression, the same concentrated solution as in Example 1 was recovered via outlet 13, but, at 57° C, an amount of 3,032 kg/h of $FeCl_3$ diluted with 4,360 kg/h of water was recycled via line 9. This solution was heated to 75° C. prior to the recycle into the column 3.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Apparatus for the production of concentrated aqueous solutions of ferric chloride, comprising (i) a first reaction zone containing a reaction vessel for digesting iron with a dilute aqueous solution of hydrochloric acid to thereby produce an aqueous solution of ferrous chloride, said reaction vessel having a first inlet connected to an iron or iron compound source, a second inlet connected to a hydrochloric acid source and a ferrous chloride outlet; (ii) a second reaction zone containing a second reaction vessel downstream from and in fluid communication with said first reaction zone for reacting chlorine with said aqueous solution of ferrous chloride in the presence of a recycled aqueous solution of ferric chloride, said second reaction vessel having a ferrous chloride inlet connected to the ferrous chloride outlet of the first reaction vessel, a ferric chloride inlet, a chlorine inlet connected to a chlorine source, and a reaction product outlet; (iii) a decompression zone downstream from and in fluid communication with said second reaction zone for decompressing reaction product emanating from said second reaction zone (ii); (iv) a recycle loop connected to the ferric chloride inlet of the second reaction vessel for recycling a fraction of decompressed liquid phase to said second reaction zone (ii); and (v) a product recovery outlet for recovering a remaining fraction of decompressed liquid phase as final product aqueous solution of ferric chloride.

2. The apparatus of claim 1, where said second reaction vessel is a stirred reactor, a distillation column or an absorption column.

3. The apparatus of claim 1, where said second reaction vessel is equipped with plates or packing rings.

4. The apparatus of claim 1, where a filter is positioned between said first reaction zone and said second reaction zone to filter said ferrous chloride.

5. The apparatus of claim 1, where said second reaction zone comprises more than one stage.

6. The apparatus of claim 5, where stages in said second reaction zone are operated in series.

7. The apparatus of claim 5, where stages in said second reaction zone are operated in parallel.

8. The apparatus of claim 1, where said ferric and ferrous inlets are at a top of the second reaction vessel and the chlorine inlet is at a bottom of the second reaction vessel.

9. The apparatus of claim 1, where said decompression zone includes a vessel equipped with a vacuum.

10. The apparatus of claim 1, wherein a heat exchanger is placed between said first reaction zone and said second reaction zone to adjust the temperature of the ferrous chloride solution introduced into said second reaction zone.

11. The apparatus of claim 1, wherein a heat exchanger is placed in said recycle loop to adjust the temperature of the ferric chloride solution introduced into said second reaction zone.

* * * * *